3,250,827
HALOGENATED ORGANIC PHOSPHONATE ESTERS

Gene E. Schroll, Louisville, Ky., assignor to Ethyl Corporation, New York, N.Y., a corporation of Virginia
No Drawing. Filed Aug. 31, 1962, Ser. No. 223,210
3 Claims. (Cl. 260—961)

The present invention relates to new and novel organophosphorus compounds, to a process of manufacturing these compounds and to compositions formed from these compounds. In particular, the invention relates to halogenated organophosphorus esters useful as flame retardants or flame-proofing additives for impregnation of plastics, textiles, cellulosic materials and paper to form in effect a whole new family of flame-resistant compositions.

While organophosphorus compounds and processes for their manufacture are known and used for numerous diverse purposes, only a few such compounds are suitable for flame-proofing purposes. Moreover, even where such compounds do show flame-proofing possibilities they are generally lacking in other vital properties essential for their major success as flame-proofing additives. Thus, for example, even through a particular compound, such as a halogenated organophosphorus compound, may provide satisfactory flame retardancy, it may cause photochemical degradation, reduce low-temperature flexibility and almost invariably produces other undesirable effects. One notable deficiency of such compounds is that of thermal instability. Thus, on many occasions, even though a compound may exhibit quite satisfactory flame-retarding properties, halogen chloride can be evolved from a material impregnated with such compound when the material is heat treated. This property is obviously quite undesirable and, among other things, produces corrosion problems because the metal parts of processing apparatus are attacked by the hydrogen chloride.

Another objectionable feature of prior art practice is that present methods of producing many of the organophosphorus compounds is inherently expensive, and therefore, even when the organophosphorus compounds in question are capable of providing some flame-proofing properties to an article, the compound may be quite impractical from a cost-effectiveness standpoint. Among the reasons for the inherent expensiveness of these compounds is that, quite often, yields of the desired organophosphorus compound are undesirably low and formation of by-products undesirably high. In addition to wasting the starting material by formation of by-products, per se, the by-products sometimes compete in the reaction and even further lessen the yield of the desired organophosphorus compound. Another reason for the inherent expensiveness of these processes is that the starting materials themselves are often quite expensive and are difficult to manufacture.

There exists, then, a particularly important need in the art for both new and improved flame retardant compounds and also for an improved method for the manufacture of these compounds. Also, there exists a need for new flame-proofed compositions or articles of manufacture formed by impregnation of various compounds from these flame-retardant compounds.

An objective of the present invention is therefore to overcome these prior art deficiencies by providing new and novel organophosphorus esters admirably suited for use as plasticizers and as flame retardant compounds, which compounds can be prepared conveniently and economically. Among the objects of this invention, in particular, is the provision of a new class of flame-retardant self-extinguishing and non-burning halogenated organophosphorus compounds. Specifically, there are provided, pursuant to this invention, compositions of matter which are extremely useful agents for imparting flame resistance to various plastics, textiles, cellulosic and paper materials. In addition, it is an object to provide a quite economical method which will produce these flame-retardant agents in excellent yields and at very low temperatures.

These and other objects are achieved in accordance with the present invention which provides the art with new and novel halogenated organic phosphonate esters, a method for providing these esters and also a new class of flame-resistant compositions or articles of manufacture.

The novel halogenated organic phosphonate esters of this invention are represented by the structure

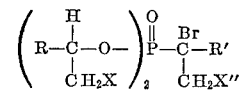

wherein R is selected from the group consisting of hydrogen and monovalent hydrocarbon radicals containing from one to about six carbon atoms, and R' is a monovalent hydrocarbon radical containing from one to about six carbon atoms, X is a halogen selected from chlorine and bromine and X" is selected from the group consisting of chlorine, bromine and cyano. Thus, the radicals of the molecule bonded through oxygen to phosphorus contain from two to eight carbon atoms and are halo-substituted on a beta-carbon atom by either a chlorine or bromine atom. The radical bonded directly through carbon to phosphorus has bromine substituted on the alpha-carbon atom, and the beta-carbon atom is substituted with a member selected from bromine, chlorine and cyano. As to R', and to R where R is a hydrocarbon radical, the hydrocarbon radical can contain from one to about six carbon atoms and can be alkyl or aryl. Thus R and R' can be, for example, methyl, ethyl, amyl, hexyl, or phenyl. The R and R' radicals can even be substituted, as with halogen or other elements or moieties, provided that these are essentially inert in the molecule. Where R is a hydrocarbon radical it is preferable that R be the same as R' because preparation of such products offers advantages.

These novel compounds are unique in their behavior as flame retardants. Thus, these compounds are characterized in particular by the presence of not less than two flame-retarding elements located upon the alpha and beta carbons of the radical which is bonded to the phosphorus atom via carbon. The flame-retardant element of the alpha carbon atom is always bromine and that of the beta carbon is preferably bromine, but can also be chlorine or cyano. Such compounds, quite unexpectedly, have been found to be excellent flame retardants and are particularly stable and highly resistant to heat degradation which, among other things, produces acid vapors. For example, some halogenated organophosphorus compounds carrying chlorine in the molecule, though used commercially, are prone to liberate hydrogen chlorine vapors when subjected to the heat used normally in processing equipment. This is obviously undesirable and has a detrimental effect not only upon the plastic composition, but also upon the processing equipment. The plastic composition itself is often discolored and gives off noxious gases as exidence of this decomposition. The present compositions, however, do not have this disadvantage and hence overcome these disadvantages of the prior art.

The novel compounds of the present invention can be considered as derivatives of phosphonic acid wherein two of the hydrogens of the hydroxyl groups are replaced by beta-carbon-halogen-substituted alkyl or aralkyl radicals, wherein a hydrogen is removed and an oxygen is bonded directly to the phosphorus, and wherein a hydroxyl group is replaced by a halogen-substituted hydrocarbon radical containing bromine on the alpha carbon atom and, on the beta carbon, and atom of bromine or chlorine, or a cyano group. Exemplary of these novel compounds are:

Bis($\beta$-chloroisopropyl)-$\alpha'$,$\beta'$-dibromo-$\alpha'$-methyl ethyl phosphonate Bis($\beta$-bromoisopropyl)-$\alpha'$,$\beta'$-dibromo-$\alpha'$-methyl ethyl phosphonate Bis($\beta$-chloro-$\alpha$-phenyl ethyl)-$\alpha'$,$\beta'$-dibromo-$\alpha'$-phenyl ethyl phosphonate Bis($\beta$-chloroisopropyl)-$\alpha'$-bromo-$\beta'$-chloro-$\alpha'$-methyl ethyl phosphonate Bis($\beta$-chloroisopropyl)-$\alpha'$-bromo-$\beta'$-cyano-$\alpha'$-ethyl ethyl phosphonate Bis($\beta$-bromo-$\alpha$-phenyl ethyl)-$\alpha'$,$\beta'$-dibromo-$\alpha'$-phenyl ethyl phosphonate, and the like.

These classes of compounds are formed by reaction of bromine chloride, bromine, or cyanogen bromide with the corresponding unsaturated phosphonate. The most preferred of these compounds because of their excellent flame-retardant properties as well as their high degree of heat stability are those adducts formed with bis($\beta$-chloroisopropyl) isopropenyl phosphenate and bromine, bromine chloride or cyanogen bromide. The adduct formed by the addition of bromine is outstanding in its effectiveness. Pursuant to these novel reactions, a bromine atom adds to the alpha carbon atom, breaking the double bond of the isopropenyl or alpha-methyl vinyl radical while the other atom—viz. bromine, chlorine or cyanogen—adds to the beta-carbon atom of the vinyl group. Because the Bis($\beta$-haloaryl)— or Bis($\beta$-haloalkyl) isopropenyl phosphonate starting material can be quite conveniently made by reaction of phosphorus oxychloride with aryl oxides or alkylene oxides, particularly from ethylene oxide and propylene oxide, these preferred compounds can be made very cheaply. These preferred compounds not only are outstanding as flame-retardants or flame-proofing agents, per se, but also excel from a cost-effectiveness standpoint. The most outstanding flame-proofing agents pursant to the present invention are Bis($\beta$-chloroisopropyl)-$\alpha'$,$\beta'$-dibromo-$\alpha'$-methyl ethyl phosphonate, Bis($\beta$-chloroisopropyl)-$\alpha'$-bromo-$\beta'$-chloro-$\alpha'$-methyl ethyl phosphonate and Bis($\beta$-chloroisopropyl)-$\alpha'$-bromo-$\beta'$-cyano-$\alpha'$-methyl ethyl phosphonate.

Of these compounds the Bis($\beta$-chloroisopropyl)-$\alpha'$,$\beta'$-dibromo-$\alpha'$-methyl ethyl phosphonate stands out in its effectiveness as a flame-proofing agent and is unique in that hydrogen chloride is not evolved even under rigorous heat applications. This unique and unexpected property is of tremendous commercial importance and is indeed astonishing in that even very close homologs of this compound liberate significant amounts of hydrogen chloride or other acid vapors when subjected to high temperature.

The novel flame-proofing agents can be considered as adducts of bromine, bromine chloride or cyanogen bromide and a compound characterized by the following structure:

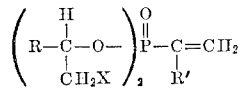

wherein R is hydrogen or a hydrocarbon radical containing from 1 to about 6 carbon atoms, said radical being selected from alkyl and aryl radicals, X is chlorine or bromine, and R′ is a hydrocarbon radical containing from 1 to about 6 carbon atoms, said radical being selected from alkyl and aryl radicals. Preferably, where R is a hydrocarbon, it is the same as R′. The present novel method for the preparation of the novel flame-retardant agents of this invention is carried out via the above addition reaction. A Bis($\beta$-haloaryl)-$\alpha'$-hydrocarbyl vinyl phosphonate or a Bis($\beta$-haloalkyl)-$\alpha'$-hydrocarbyl vinyl phosphonate, preferably Bis($\beta$-chloroisopropyl)-$\alpha'$-methyl vinyl phosphonate, is contacted with bromine, bromine chloride or cyanogen bromide, at temperature preferably ranging from about 0° C. to about 80° C., to form the novel flame-proofing agents of this invention. Higher or lower temperatures can also be used though generally it is best for reasons of economy to conduct the reaction at from about 20° C. to about 50° C. Also it is preferable to conduct the reaction in the presence of solvents, though this is not essential. The reactants are preferably added in approximately stoichiometric proportions but either reactant may be employed in excess. Also, supra-atmospheric pressure can be employed but substantially atmospheric pressure is preferred for greater economy.

In accordance with a preferred feature of the invention the flame-retarding agents are added to or incorporated in numerous inflammable organic substances such as textiles, cellulosic materials, paper, cardboard, plastics, resins and the like, to impart flame-resistant properties to these materials. For example, in plastic applications, these agents are added to and incorporated in the organic polymerizable mixtures to produce flame-retardant polymers. Accordingly, dependent upon the particular use, from one-half to about fifty parts by weight of the flame-retarding agent, or of a mixture of such agents, are added per 100 parts by weight of the polymerizable mixture. Thus, the flame-retarding agent is added to the polymerization recipe and is incorporated in the polymerizable material before the material has polymerized sufficiently to form a wholly solid polymer. The flame-retardant agent becomes part of the polymerizable mixture and, after polymerization, is part of the plastic product.

The invention finds particular application in the production of flame-retardant resins and plastics from organic polymerizable monomers such as polystyrenes, polyvinyl acetate, polyvinyl chloride, polyformaldehyde (polyoxymethylene), polymethyl methacrylate, epoxy resins, unsaturated polyesters, and polyurethane foams. Other useful flame-retardant plastic articles of manufacture made pursuant to the practice of the present invention are those fabricated from acrylonitrile, vinylidene chloride, neoprene, rubber, and numerous textile, paper, and cellulosic materials. The additives also have utility for copolymers of these and various other plastic materials such as the polyformaldehyde cyclic ether copolymers, vinyl chloride copolymers, vinylidene chloride copolymers, and the like. These flame-resistant polymers and copolymers can also be used with other polymers and copolymers.

A particularly preferred class of flame-resistant compositions prepared by incorporation therein of the novel flame-retardant agents of this invention are those plastic compositions formed from organic polymerizable monomers having one or more ethylenic double bonds, for example, conjugated dienes such as butadiene, isoprene, dichlorobutadiene, 2-chloro-1,3-butadiene; also vinyl acetate, vinyl chloride, vinylidene chloride, acrylonitrile, methyl styrene, para-chlorostyrene and the like. Preferably from about one-half to about 25 parts of the flame-retardant agent is employed per 100 parts of the organic polymerizable monomer. In most applications it is best to employ from about 5 to about 15 parts of the agent for 100 parts of monomer but more than 25 parts per 100 parts of monomer can be employed.

The following non-limiting examples illustrate the present invention. In these examples all parts are given by weight unless otherwise specified.

EXAMPLE I

To 70 parts of carbon tetrachloride were added 27.5 parts of Bis(β-chloroisopropyl) isopropylene phosphonate and to 35 parts of carbon tetrachloride were added 15.8 parts of bromine. Both of these solutions were charged into a vessel fitted with agitating means and a temperature-measuring device. The solution was stirred for four hours at 25° C. The reaction product was then separated by evaporation, washed with sodium thiosulfate solution, and separated. The remaining water-white fluid was found to weigh 41.8 parts, corresponding to a yield of 96 percent Bis(β-chloroisopropyl)-α',β'-dibromo-α'-methyl ethyl phosphonate.

Polystyrene molding powder and styrene monomer are then mixed together in the proportions of about 3.4 parts of powder to 5 parts monomer, and the mixture is stirred for several hours in a mixing vessel until a homogeneous solution is formed. To 85 parts of the homogeneous mixture are then added 1.5 parts by weight of the Bis(β'-chloroisopropyl)-α',β'-dibromo-α'-methyl ethyl phosphonate, 1 part benzoyl peroxide and 7 parts of petroleum ether. This mixture is polymerized by heating in an hermetically sealed vessel for 70 hours at 50° C., followed by a 20-hour period of heating at 70° C. A powdery material is thus formed. The powder is then pre-expanded by heating with steam for 3 minutes to give a bulk density approximating 3 pounds per cubic foot. Such pre-expanded granules are next placed in a vessel filled with boiling water and heated for 10 minutes. At the end of this period the material is cooled in air to a temperature of 25° C. A piece of the polymerized solid was tested and found to be essentially non-combustible.

EXAMPLE II

When 20 parts of Bis(β-chloroisopropyl)-α'-bromo-β'-chloro-α'-methyl ethyl phosphonate per 100 parts of the polymerizable mixture are substituted for Bis(β-chloroisopropyl)-α',β'-dibromo-α'-methyl ethyl phosphonate in the formulation described in the preceding example, and the polymer is molded as above, a strip from the molded product is found to have very good flame-retardant properties.

EXAMPLE III

Bis(β-chloroisopropyl)-α'-bromo-β'-cyano-α'-methyl ethyl phosphonate is prepared by the addition of a stoichiometric amount of cyanogen bromide to Bis(β-chloroisopropyl)α'-methyl vinyl phosphonate. A solution of 27.5 parts of Bis(β-chloroisopropyl)-α'-methyl vinyl phosphonate in 35 parts of carbon tetrachloride is treated with a solution of 11 parts of cyanogen bromide in 35 parts of carbon tetrachloride. The addition of the cyanogen bromide is made over a 3-hour period while maintaining a temperature below 25° C. After a total reaction time of approximately five hours, the mixture is evaporated and the residue heated at 75° C. for about 10 minutes. The water-white product is obtained in 95.7 percent yield.

Five parts of chloroprene rubber and 5.4 parts of polystyrene are placed in a vessel and dissolved in 120 parts of styrene monomer. To this mixture are then added 3 parts of the Bis(β-chloroisopropyl)-α'-bromo-β'-cyano-α'-methyl ethyl phosphonate, 5 parts dry benzoyl peroxide and 12 parts petroleum ether. This mixture is heated for approximately 100 hours at 57° C., and then for an additional 20 hours at 70° C. From a portion of the residual solid product, in the form of discrete particles resembling molding powder, a molding is prepared by heating for three minutes in boiling water. The pre-expanded powder has a bulk density of approximately 2.8 pounds per cubic foot. A portion of these pre-expanded granular particles is placed in a mold and boiled in water for 10 minutes, then rapidly cooled in cold water to a temperature of 25° C. A strip of the molding prepared from the polymerized material is found to provide very good flame-retardant properties.

EXAMPLE IV

Bis(α - 2 - chloro - n - butyl - β - bromoethyl) - α',β'-dibromo-α'-n-butyl ethyl phosphonate is prepared by bromination of Bis(β-bromoisopropyl)-α'-n-butyl vinyl phosphonate.

Films 10 millimeters in thickness were cast or formed of the following composition:

Polyvinyl chloride (Goodrich Geon 101–EP)—100 parts
Plasticizer—50 parts
Organotin stabilizer (Metal and Thermit Thermolite 31)—4 parts.

These films were formed by adding the foregoing composition, in 10 weight percent concentration, to tetrahydrofuran. This solution was then evaporated to dryness in a hood. Test strips were formed from this material and observations were made of compatability (clarity) and plasticizing efficiency (flexibility). Also, 0.5 inch by 6 inch strips were submitted to an ASTM D–1433–58 flame-resistance test.

EXAMPLE V

To illustrate the effectiveness of the novel compounds as plasticizers and as flame retardants for polyvinyl chloride, Bis(β-chloroisopropyl)-α',β'-dibromo-α'-methyl ethyl phosphonate was employed as the plasticizer. Upon direct application of a flame it was found that the sample would not support combustion. As soon as the flame was removed, burning, if any had in fact occurred, immediately ceased. The polyvinyl chloride sample was thus rendered flame-resistant.

Moreover, the sample was quite clear, evidencing no signs whatever of incompatibility, and flexible. Thus, it excelled in compatibility and plasticizing efficiency, and was self-extinguishing or non-burning.

In sharp contrast to the foregoing example, however, when four of the widely used commercial plasticizers were used in lieu of the Bis(chloroisopropyl)-α',β'-dibromo-α'-methyl ethyl phosphonate very poor results were obtained.

When the foregoing Example V was repeated except that dioctyl phthalate, tricresyl phosphate, tris(2,3-dibromopropyl)phosphate and trichloroethyl phosphate were used respectively as plasticizers in the same polyvinyl chloride and in the same proportion, the following results were obtained.

*Plasticizers not of the present invention*

| Plasticizer | Compatibility | Efficiency | Flame Resistance |
| --- | --- | --- | --- |
| Dioctyl phthalate | Slightly foggy | Very flexible. | Burning rate 40–45 inches per minute. |
| Tricresyl phosphate. | do | do | Non-burning. |
| Tris(2,3-dibromopropyl) phosphate. | Clear-spews | Slightly stiff. | Do. |
| Tri(chloroethyl) phosphate. | Very foggy | Very flexible. | Do. |

From a comparison of the results of Example V with the tabulated results, it is seen that Bis(chloroisopropyl)-α',β'-dibromo-α'-methyl ethyl phosphonate is an excellent plasticizer and has excellent compatibility and plasticizing efficiency. On the other hand, however, the plasticizers not of this invention (shown in the table) are lacking in the extremely important property of compatibility. Furthermore, one of these plasticizers, the well-known tris(2,3-dibromopropyl)phosphate, lacks efficiency and another, dioctyl phthalate, offers little if any flame retardancy. It is thus seen that the compounds of the present invention offer many advantages over present commercial plasticizers.

EXAMPLE VI

When Bis($\alpha$-phenyl-$\beta$-chloroethyl)-$\alpha'$-bromo-$\beta'$-chloro-$\alpha'$-phenyl ethyl phosphonate is prepared from Bis($\beta$-bromoisopropyl)-$\alpha'$-phenyl vinyl phosphonate by reaction with bromine chloride and this product substituted for Bis($\beta$-chloroisopropyl) - $\alpha',\beta'$ - dibromo - $\alpha'$ - methyl ethyl phosphonate in the formulation of Example V and similar films are prepared, the films have good flame-proofing properties and provide very good compatibility and efficiency.

EXAMPLE VII

Example V was repeated in all details except that the plasticizer consists of a mixture of 5 parts of Bis($\beta$-chloroisopropyl)-$\alpha',\beta'$-dibromo-$\alpha'$methyl ethyl phosphonate and 45 parts of dioctyl phthalate, rather than 50 parts of Bis($\beta$-chloroisopropyl)-$\alpha',\beta'$-dibromo-$\alpha'$methyl ethyl phosphonate. In other words, 10 percent of the dioctyl phthalate was replaced by Bis($\beta$-chloroisopropyl)-$\alpha',\beta'$-dibromo-$\alpha'$-methyl ethyl phosphonate. Compatibility and efficiency tests carried out as above, indicated excellent results by the use of this plasticizer, whereas dioctyl phthalate, as noted previously, showed poor compatibility when used alone. Furthermore, the plasticizing mixture using as an ingredient a compound of the present invention provided excellent flame retardency whereas dioctyl phthalate alone is a poor flame-retardant.

EXAMPLE VIII

When 30 weight percent of Bis($\beta$-chloroisopropyl)-$\alpha',\beta'$-dibromo-$\alpha'$-methyl ethyl phosphonate was added to polystyrene and a film cast as in Examples V–VII the resulting composition was found to be non-burning.

EXAMPLE IX

When 17 parts, per 100 parts of plastic, of Bis($\beta$-chloroisopropyl)-$\alpha',\beta'$-dibromo-$\alpha'$-methyl ethyl phosphonate is incorporated into polymethyl methacrylate a flame-resistant film is also formed.

EXAMPLE X

When 12 parts, per 100 parts total weight of plasticized mixture, of Bis($\beta$-chloroisopropyl)-$\alpha',\beta'$-dibromo-$\alpha'$-methylethyl phosphonate is added to a standard Nopco urethane foam system the foam becomes flame-resistant.

EXAMPLE XI

A solution of 27.5 parts of Bis($\beta$-chloroisopropyl)-$\alpha'$-methyl vinyl phosphonate in 36 parts of carbon tetrachloride is treated with a carbon tetrachloride solution of a stoichiometric equivalent of bromine chloride. The reacting mixture is maintained at 20° C. After a reaction period of 2 hours the solution is evaporated yielding 35.2 parts of a clear product. This corresponds to a yield of 90.4 percent.

This phosphonate ester is mixed with three times its weight of a high-molecular-weight polystyrene molding powder. This mixture, found to be compatible in all instances, is then fed into an extruder operated at a temperature of about 180° C. The extruded product is found to be quite heat-stable as well as flame retardant, no significant amount of degradation of the product occurring. When the extruded mixture is hardened and cut into thin strips, and a flame applied directly to these strips it is found that the plastic material is flame-resistant and self-extinguishing. When the compound is burning, it is also found that the heat generated from the burning material is quite low.

Similarly good results are obtained when this run is repeated and the phosphonate is employed as a plasticizer with polyvinyl chloride, polyvinyl acetate, copolymers of polyvinyl chloride and polyvinyl acetate (80 percent polyvinyl chloride and 20 percent polyvinyl acetate) and also with vinylidene chloride and a copolymer of polyvinyl chloride and vinylidene chloride (85 percent polyvinyl chloride and 15 percent vinylidene chloride).

In sharp contrast, when the non-brominated phosphonate ester—viz. Bis($\beta$-chloroisopropyl)-$\alpha'$-methyl vinyl phosphonate—is blended in styrene and subjected to the same treatment, decomposition of the plastic results. In fact, a noxious gas is given off and the plastic is found to bleed. In further contrast with the novel phosphonate esters of the present invention, when This($\beta$-chloroisopropyl)phosphate and Bis($\beta$-chloroisopropyl)-$\alpha'$-chloropropane phosphonate are subjected to similar treatment, correspondingly poor results are obtained. These compositions are thus unsuitable as plasticizers.

EXAMPLE XII

Several specimens of cellulose acetate and several specimens of cotton fabric are thoroughly impregnated with a saturated solution of Bis($\beta$-chloroisopropyl)-$\alpha',\beta'$-dibromo-$\alpha'$-methyl ethyl phosphonate in pentane and then the materials are dried at 100° C. in a vacuum oven. The cellulose acetate fibers, containing approximately 15 percent of the phosphonate, are found to be very flame-resistant and remain so even after several washings. Further, the "hand" of the material is satisfactory in all respects.

The specimens of cotton fabric, containing from 10–15 percent of the phosphonate ester, are found to be highly flame-resistant and remain so even after several launderings in aqueous neutral soap solutions.

Equally satisfactory results are obtained when the cellulose acetate and cotton fabrics are treated with Bis($\alpha$-hexyl-$\beta$-chloroethyl)-$\alpha',\beta'$-dibromo-$\alpha'$-hexyl ethyl phosphonate, Bis($\alpha$-amyl-$\beta$-bromoethyl)-$\alpha',\beta'$-dibromo-$\alpha'$-amyl ethylphosphonate, Bis($\beta$-chloroisopropyl)-$\alpha'$-bromo-$\beta'$-chloro-$\alpha'$-methyl ethyl phosphonate and Bis($\beta'$-bromoisopropyl)-$\alpha'$-bromo-$\beta'$-chloro-$\alpha'$-methyl ethyl phosphonate.

EXAMPLE XIII

The phosphonates of Example XII are separately dissolved in carbon tetrachloride to form saturated solutions. Various paper and cardboard materials are then immersed in the carbon tetrachloride solutions. These materials are removed from the liquid, air dried and then placed in a vacuum oven at a temperature of 100° C. for twenty minutes. A flame is touched to each of the paper articles. It is found that the paper articles, in general, burn for only a few seconds, then cease burning.

EXAMPLE XIV

Seventy parts of polyvinyl chloride-polyvinyl acetate copolymer (80 parts polyvinyl chloride and 20 parts polyvinyl acetate) are intimately mixed with 30 parts by weight of Bis($\beta$-bromoethyl)-$\alpha',\beta'$-dibromo-$\alpha'$-methyl ethyl phosphonate and 30 parts of dioctyl phthalate and the mixture is worked on a roll mill at 150° C. until a homogeneous composition is formed. A portion of this composition is molded into a sheet 0.04 inch in thickness. When flame is applied to this sheet it is found that the material is non-inflammable.

EXAMPLE XV

Twenty parts by weight of bis($\beta$-chloroethyl)-$\alpha',\beta'$-dibromo-$\alpha'$-methyl ethyl phosphonate are thoroughly mixed with 100 parts of a copolymer of tolylenediisocyanate and polypropylene glycol, 0.5 part of a silicone oil, and 2 parts of N-methyl morpholine. Addition of 2.2 parts of water to the mixture produces a polyurethane foam with a density of about 2.6 pounds per cubic foot. Unlike the foam produced without the phosphonate additive, the product is flame resistant and self-extinguishing.

EXAMPLE XVI

Fifteen parts of bis($\beta$-chloroisopropyl)-$\alpha',\beta'$-dibromo-$\alpha'$-methyl phosphonate is incorporated with the monomeric formaldehyde formed by pyrolytic treatment for one and one-half hours of seventy parts of alpha-polyoxymethylene. The reaction mixture is placed in a reaction chamber at −30° C. and rapidly agitated with 525 parts of decahydronaphthalene and 5 parts of a non-ionic dispersing agent formed by complete esterification with oleic acid of polyethylene glycol having a molecular weight of 400. The formaldehyde is introduced continuously in cold mixture with nitrogen (−15° C.) during the one-and-one-half-hour period and the other ingredients are charged initially into the reaction vessel. The polymer is stirred for a total period of two hours, thirty minutes after polymerization is substantially complete or thirty minutes after the flow of formaldehyde to the vessel had been completed. The system is filtered with suction, and the product is washed with ether, and then air and vacuum-dried to yield the formaldehyde polymer.

A strip of the formaldehyde polymer is found to be flame-resistant.

EXAMPLES XVII–XXI

Five copolymerization runs are made employing a bulk polymerization technique. Propene, 1-butene and 1-hexene are individually employed as monoolefinic monomers. Upon addition of 3 parts of bis($\beta$-chloroisopropyl)-$\alpha',\beta'$-dibromo-$\alpha'$-methyl ethyl phosphonate reaction of 20 parts of trioxane under dry nitrogen with one part of the olefinic monomer in the presence of boron trifluoride diethyl etherate catalyst and heating of the mixture to the melting point (70° C.) while stirring, polymers are formed which have very good flame-resistant properties.

EXAMPLE XXII

Into a reaction pot equipped with a high-speed stirrer are charged 100 parts of trioxane, 220 parts of benzene and 35 parts of bis($\beta$-chloroisopropyl)-$\alpha',\beta'$-dibromo-$\alpha'$-methyl ethyl phosphonate. The essentially anhydrous reaction mixture is flushed with dry nitrogen. Dry propene is passed into the stirred solution and 0.1 part of boron trifluoride etherate catalyst is added. Stirring accompanied by admission of propene is continued for 6 hours with hourly addition of another 0.1 part of catalyst.

Methyl alcohol (158 parts) is thereafter added to the reaction mass and the suspension of polymer is filtered. The polymer is then extracted with benzene for one hour and allowed to dry in the air after which it is dried in vacuum. The resultant polymer is found to have very good flame-resistant properties.

EXAMPLE XXIII

To a reactor are added 95 parts of trioxane and 5 parts of purified styrene with 100 parts of cyclohexane solvent and 0.09 part by volume of boron trifluoride dibutyl etherate catalyst. Also added are 40 parts of bis(chloroisopropyl) - $\alpha',\beta'$ - dibromo-$\alpha'$-methyl ethyl phosphonate. The mixture is stirred for one minute and then heated to 55° C. for one hour. After this time, the reaction mass is treated with 100 parts by volume of methanol; then the mixture is transferred to a high-speed mixer for dispersion of the polymer in the methanol. The polymer is then collected and dried at 50° C. in vacuo, the yield being 40 percent. The polymer is found to have good properties of flame-resistance.

The phosphonate esters of this invention not only produce flame-resistant compositions but also provide plasticizing properties which render various plastic compositions less brittle and more easily workable. The phosphonate esters can be incorporated into the plastic or other compositions by any of the well known methods. For example, the phosphonate ester can be dissolved in polyvinyl chloride at elevated temperatures. Thus, the mixing can be done, for example, on a heated roll mill or in an internal mixer. Also, these phosphonate esters can be blended with the various monomeric materials prior to polymerization in a normal polymerization recipe, as in emulsion and suspension polymerization systems.

The flame-retarding agents of the present invention can be used in widely varying proportions in various materials to provide good fire-resistant properties for articles of manufacture. The amount of the presently contemplated halogenated organic phosphonate esters can range as high as 50 weight percent, or even higher. Thus, where the ester is incorporated in cellulose acetate and other thermoplastic cellulose derivatives to form transparent sheets and lacquers, as much as 50 weight percent can be used, and this in conjunction with other plasticizers which are used to impart other desirable characteristics. Obviously, however, lesser amounts, even very small amounts, of the flame-retarding agent of this invention can be used in some applications with advantage. Thus, non-inflammable cellulose acetate sheeting is made, for example, with the flame-retarding agents of this invention present in proportions of 30–50 weight percent, based on the total weight of the cellulose acetate sheeting. On the other hand, as little as one weight percent concentration of the additives can provide advantages in some applications.

The present additives are very useful and very effective in polyester and polyurethane resins. Generally as much as 25 percent of the additive can be incorporated into these resins with good compatibility. In concentrations as high as 15–20 percent a resin is obtained having good self-extinguishing characteristics. The "flexibility" properties of the resultant polyurethane are not significantly altered where the polyurethane foam is used as a latex.

Polyvinyl acetate films and coatings are rendered flame-retarding generally by the incorporation therein, preferably, of from about 10 to 15 percent of the present phosphonate additives.

The present additives are excellent plasticizers for polyvinyl chloride and more effective than many phosphate esters commonly used. The present additives are compatible in concentrations ranging as low as one and as high as 25 percent and provide particularly good flame-retarding properties when used in concentrations of from about 5–15 percent.

Any of the compounds of this invention can be incorporated into or blended with various cellulosic, textile, paper and plastic materials in any range of concentrations as may be required depending upon the nature of the materials to which the compound is added. These compounds or flame-retardant agents are most generally used in concentration ranging from about 0.5 weight percent to as much as 25 weight percent, and more for special purposes. These flame-retarding agents can be used alone or in combination. Also, they can be used in conjunction with other additives, including other flame-retarding agents.

The solvents employed in any of the solution polymerization processes or in the bromination process may be any solvents which are inert to the reactants. Thus, liquid hydrocarbons (paraffins, cycloparaffins, aromatics, or mixtures of these), glycol ethers, inert monoethers (dialkyl ethers, dicycloalkyl ethers, diaryl ethers, diaralkyl ethers, or mixed ethers in which the organic groups are taken from different classes—viz., alkyl, cycloalkyl, aryl and aralkyl groups), saturated halohydrocarbons, and the like may be employed. Typical of these solvents are hydrocarbons such as hexane, heptane, octane, cyclohexane, methylcyclohexane, benzene, toluene, xylene, petroleum distillates such as naphtha, kerosene, and gasoline, halogenated hydrocarbon compounds such as carbon tetrachloride, ethylene dibromide, methylene chloride, glycol ethers such as the dimethyl ether of diethylene glycol, the diethyl ether of diethylene glycol, monoethers such as diethyl ether, dibutyl ether, dicyclohexyl ether, dibenzyl ether, diphenyl ether, methyl phenyl ether and the like.

Having described the invention, what is claimed is:
1. Bis(β-chloroisopropyl)-α',β'-dibromo-α'-methyl ethyl phosphonate having the formula:

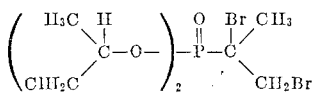

2. Bis(β-bromoisopropyl)-α',β'-dibromo-α'-methyl ethyl phosphonate having the formula:

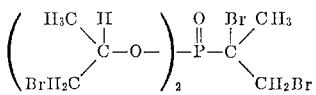

3. Bis(β-chloroethyl) - α',β'-dibromo - α'-methyl ethyl phosphonate having the formula:

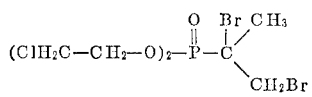

References Cited by the Examiner
UNITED STATES PATENTS

| | | | |
|---|---|---|---|
| 2,979,478 | 4/1961 | Melton et al. | 260—30.6 |
| 2,993,859 | 7/1961 | Watson | 260—461.310 XR |
| 3,046,236 | 7/1962 | Jahn | 260—461.310 XR |
| 3,047,606 | 7/1962 | Wadsworth | 260—461 |
| 3,061,571 | 10/1962 | Updegraff | 260—30.6 |
| 3,064,030 | 11/1962 | Chadwick | 260—30.6 |

OTHER REFERENCES

Kabachnik, "Chem. Abst.," vol. 42, col. 4132(h) (1948).

CHARLES B. PARKER, *Primary Examiner.*

MORRIS LIEBMAN, *Examiner.*

AUBREY DENT, FRANK SIKORA, R. L. RAYMOND,
*Assistant Examiners.*